United States Patent [19]
Lokkart

[11] 3,961,214
[45] June 1, 1976

[54] VELOCITY PICK-OFF WITH NOISE CANCELLATION

[75] Inventor: Hendricus Johannes Lokkart, Arleta, Calif.

[73] Assignee: International Telephone & Telegram Corporation, New York, N.Y.

[22] Filed: June 18, 1975

[21] Appl. No.: 588,015

[52] U.S. Cl. ............................ 310/155; 310/168; 310/111
[51] Int. Cl.² ........................................ H02K 21/38
[58] Field of Search ............ 310/168, 111, 185, 15; 329/178, 179

[56] References Cited
UNITED STATES PATENTS

| | | | |
|---|---|---|---|
| 2,669,669 | 2/1954 | Spaulding | 310/155 X |
| 2,718,603 | 9/1955 | McLean | 310/155 |
| 3,133,214 | 5/1964 | Lawson, et al. | 310/15 |
| 3,134,918 | 5/1964 | Eichenberger et al. | 310/168 |
| 3,158,033 | 11/1964 | Cohen | 310/155 X |
| 3,564,313 | 2/1971 | Goor | 310/168 |
| 3,780,313 | 12/1973 | Wiegand | 310/168 X |
| 3,911,302 | 10/1975 | DeClaire | 310/168 |

*Primary Examiner*—Donovan F. Dugan
*Attorney, Agent, or Firm*—A. Donald Stolzy

[57] ABSTRACT

Apparatus for producing information pulses including, for example, two magnetic pick-ups spaced apart $nd$, where $n$ is any positive odd integer and $d$ is equal to one-half the spacing between the centers of two immediately adjacent teeth of a rotatable ferromagnetic armature. The pick-ups have coils which are connected in phase so that noise is neglected. The apparatus is selective and discriminates against voltages induced by vibration, by an internal combustion engine ignition system coil or by other means. The system is useful for providing a velocity analog for any purpose including, but not limited to, an anti-skid braking arrangement for motor vehicles.

10 Claims, 6 Drawing Figures

U.S. Patent  June 1, 1976  3,961,214 ent in the coil. The frequency of this alternating voltage is then directly proportional to the angular velocity of the rotating shaft. This prior art construction suffers from the two serious disadvantages that can increase or decrease the number of cycles of the coil output and thereby give an erroneous velocity analog. For example, vibration can cause the gear-like structure to move back and forth axially toward away from the permanent magnet. Extraneous alternating signals may, thus, be generated in the coil.

VELOCITY PICK-OFF WITH NOISE CANCELLATION

BACKGROUND OF THE INVENTION

This invention relates to the art of noise discrimination, and more particularly, to apparatus for reproducing a desired signal without reproducing noise that accompanies it.

In the past, it has been the practice to obtain a pulse analog of the velocity of a rotating shaft by passing a toothed ferromagnetic gear-like structure of a magnetic material adjacent a permanent magnet having a coil therearound. An alternating voltage is, thus, induced in the coil. The frequency of this alternating voltage is then directly proportional to the angular velocity of the rotating shaft. This prior art construction suffers from the two serious disadvantages that can increase or decrease the number of cycles of the coil output and thereby give an erroneous velocity analog. For example, vibration can cause the gear-like structure to move back and forth axially toward away from the permanent magnet. Extraneous alternating signals may, thus, be generated in the coil.

It is conventional to employ a velocity analog device in anti-skid braking systems for motor vehicles. In this case, it will be appreciated that vibration can be a substantial problem. Further, in the case of anti-skid braking systems, the coil employed with the ignition system of an internal combustion engine can induce a voltage in the magnetic pick-up for developing an analog of the velocities of two braked wheels.

From the foregoing, it will be appreciated that both the vibration and the induced voltage problems of the prior art make it impossible to obtain an accurate velocity analog. Prior art which is more accurate is more complex and expensive. See U.S. Pat. No. 3,755,745.

SUMMARY OF THE INVENTION

In accordance with the apparatus of the present invention, the above-described and other disadvantages of the prior art are overcome by discriminating against the aforesaid and other noise.

Two permanent magnets or ferromagnetic bars or the like and two coils therearound, respectively, may be provided. The permanent magnets are spaced apart a distance such that the voltages induced in the coils, due to the passage of a gear-like respective ferromagnetic or permanent magnet structure adjacent thereto, are out of phase with respect to each other when properly connected. It has been found that with this uncomplicated and inexpensive apparatus, unexpectedly, although there is signal generation due to shaft rotation, noise generated because of vibration and as otherwise described herein can be substantially reduced.

The above-described and other advantages of the present invention will be better understood from the following detailed description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
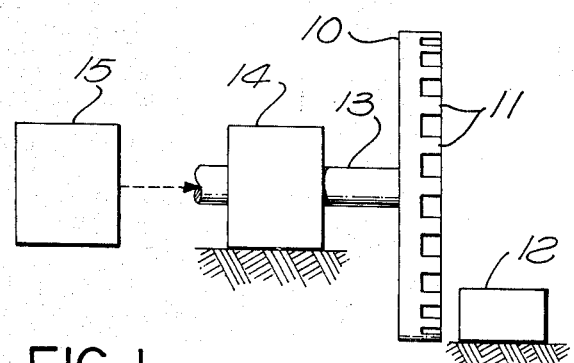
FIG. 1 is a side elevational view of a portion of the structure of the present invention.

In FIG. 1, a gear-like ferromagnetic structure 10 has teeth 11 which pass by two magnetic pick-ups, only one being shown at 12. Structure 10 may be made of soft iron, if desired. Structure 10 is fixed to a shaft 13 that is journaled in a fixed bearing 14. Shaft 13, thus, is rotatable in bearing 14 but is not slidable therethrough.

As bearing 14 is fixed, so are pick-ups 12 and 12'. See FIGS. 1 and 3. A device 15 rotates shaft 13. Typically, structure 10 may be fixed to the wheel of a truck so that an output signal may be generated directly proportional to the angular velocity of the wheel. Structure 10 is shown in a perspective view of FIG. 2.

Figure 3:
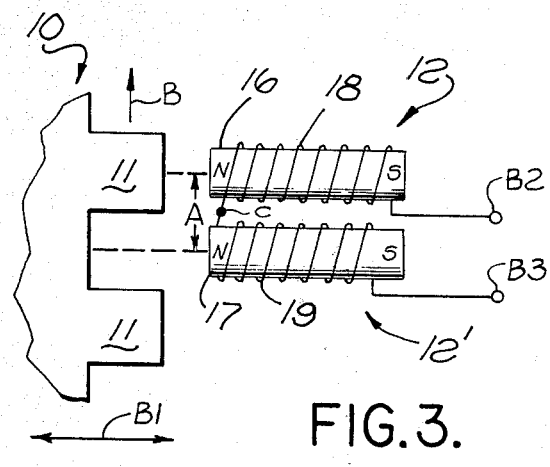
FIG. 3 is a diagrammatic view of one embodiment of the present invention.
Figure 4:
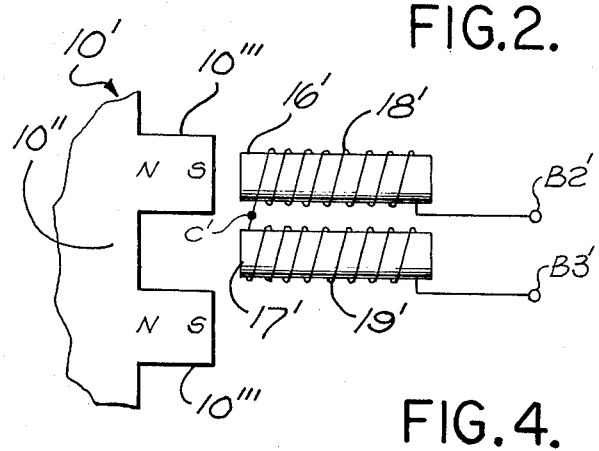
FIG. 4 is a diagrammatic view of another embodiment of the present invention.

As shown in FIG. 3, pick-ups 12 and 12' include two permanent magnets 16 and 17, respectively, which are poled in the same direction. Magnets 16, 17 and 10''' in both FIGS. 3 and 4 may alternatively be soft iron pole pieces backed up by magnets. The left ends of magnets 16, 17 and 10''' may all be north poles, and the right ends thereof may all be south poles. However, the left ends of magnets 16, 17 and 10''' may be south poles, if desired.

Magnets 16 and 17 have coils 18 and 19 therearound which are wound in the same direction and connected out of phase for signal generation. Note will be taken that each of the teeth 11 of structure 10 has a width equal to the space between teeth, although this is not critical. Magnets 16 and 17 are spaced a distance A equal to the width of one tooth, although this also is not critical.

OPERATION

Figure 5:
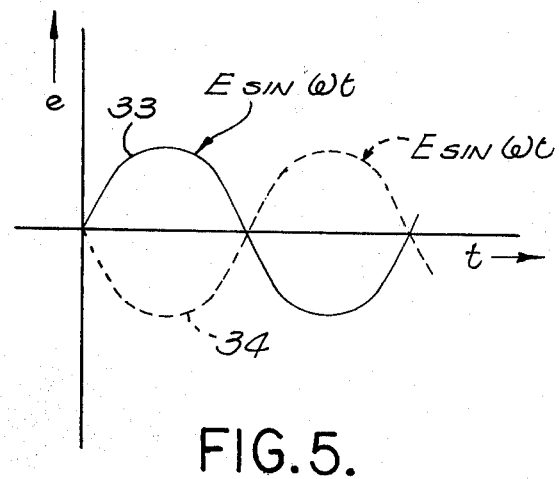
FIG. 5 is a graph of two waveforms characteristic of the operation of the present invention.
Figure 6:
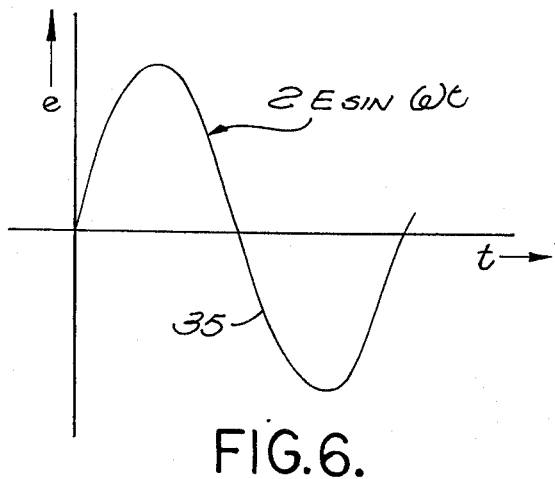
FIG. 6 is a graph of still another waveform characteristic of the operation of the present invention.

Operation of the circuit of FIG. 3 may be better understood from the following description of FIG. 5. If, for example, a voltage 33 (potential of terminal B2 relative to that of junction C), shown in FIG. 5, is induced in coil 18 by the passage of teeth 11 of structure 10 contiguous to the magnet 16 in the direction of an arrow B, another voltage will be induced (potential of terminal B3 relative to that junction C) in coil 19 as indicated at 34. Note will be taken that voltage 34 is precisely 180 degrees out of phase with the signal at 33. However, coils 18 and 19 are connected so that the voltages subtract giving the waveform 35 in FIG. 6 between terminals B2 and B3.

The manner in which the device of the invention discriminates against unwanted induced voltages or noise is as follows. If magnets 16 and 17 in FIG. 3 are subjected to changing airgap in a direction the same as that of the longitduinal axes of magnets 16 and 17, or having a component in that direction, e.g. that induced by structure 10 moving as indicated at B1, the voltages induced in coils 18 and 19 will be connected in phase, i.e. as the coils 18 and 19 are connected as shown in FIG. 3.

Prior art toothed-rotor tachometers are described and illustrated in *Handbook of Transducers for Elec-*

*tronic Measuring Systems*, by Harry N. Norton, Prentice-Hall, Inc., Englewood Cliffs, N.J. (1969).

The following patents disclose signal transmission systems within the field of the present invention, but these patents do not disclose the invention itself: U.S. Pat. Nos. 1,935,776; 3,349,177; 3,461,390; and 3,594,555.

Note will be taken that if other suitable measures, if needed, are taken, changes in the apparatus of the invention described or illustrated herein can be made. Such changes may be made at least in the following without departing from the invention:

1. The directions of either one or both of the windings of coils 18 and 19 may be reversed, for example, with or without reversal of the connections of coils 18 and 19, respectively.

2. The connections of either one or both of coils 18 and 19 may be reversed with or without the directions of the windings of coils 18 and 19 reversed, respectively.

A conventional pulse frequency detector may be connected from the output at terminals B2 and B3 to visually indicate the pulse repetition frequency of the pulses appearing thereat. Alternatively, the pulse output at terminals B2 and B3 may be employed in a conventional anti-skid braking system on an automotive vehicle with or without a connection through a squarer and/or flip-flop.

Coils 18 and 19 are preferably similar or identically wound and in the same direction, but one may be wound in the reverse direction if its leads are reverse connected.

The magnets 16 and 17 need not be, but preferably are, bar magnets of a uniform cross section. Magnets 16 and 17 have axes aligned with teeth 11.

The distance between the magnet axes is preferably $nd$, where $n$ is any positive odd integer, and $d$ is one-half the distance between the centers of two immediately adjacent teeth 11. Preferably, the space between teeth is equal to $d$. Preferably, $n = 1$ to ensure that in-phase vibration or other undesirably induced voltages in coils 18 and 19 are of the same phase and/or amplitude.

Figure 2:
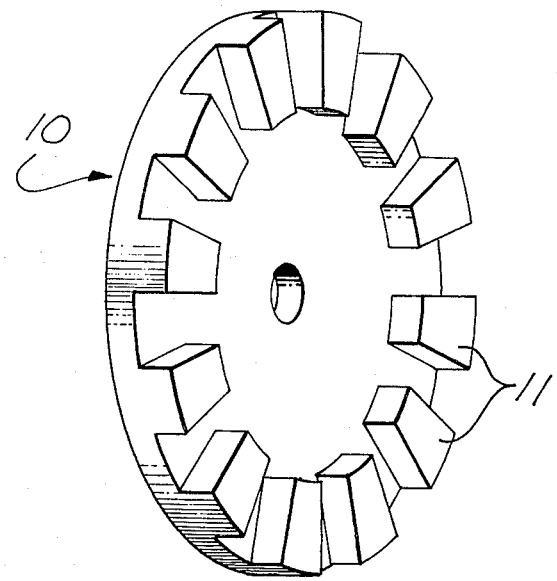
FIG. 2 is a perspective view of a gear-like structure which may be employed with the present invention.

The teeth in FIG. 2 project from a disc having a central cylindrical hole therethrough, the disc being a right cylinder except for the hole. The teeth 11 all have the same nominal width. The nominal spacing between two immediately adjacent teeth is equal to the nominal tooth width. However, each tooth is actually defined by four surfaces. Two surfaces lie in portions of imaginary cylinders concentric to the hole axis. The other two surfaces are flat and lie in imaginary flat planes through the hole axis. For a total of 16 teeth, for example, (not shown — 12 teeth are shown) the flat planes defining any one tooth intersect at an angle of 360° ÷ (16 teeth + 16 valleys) = 360°/32 = 11.25°.

The device of the present invention is by no means limited to the specific form of structure 10 shown in FIG. 2 and described herein. Structure 10 may be any conventional structure. For example, in FIG. 4 coils 18' and 19' may be the same as coils 18 and 19, respectively, and terminals B2' and B3' may be the same as terminals B2 and B3 with junction C' the same as junction C. However, cores 16' and 17' are ferromagnetic, but not permanent magnets. Structure 10' has a non-magnetic disc 10'', and permanent magnets 10''' fixed thereto.

The phrase "approximately in phase" is hereby defined for use herein and in the claims to mean within about ±90 electrical degrees, but preferably about or exactly zero electrical degrees.

The phrase "approximately 180° out of phase" is hereby defined for use herein and in the claims to mean between about 90 to 270 electrical degrees, but preferably about or exactly 180 electrical degrees.

Unless otherwise provided herein, the claims herein are hereby defined to include, but not be limited to, two or more permanent magnets or electromagnets or ferromagnetic cores at different locations with one or more coils wound on each.

The phrase "a series of pulses" is hereby defined to include a square wave, a sine wave or otherwise.

Teeth 11 may be moved to the inside, outside, or at any angle, if desired, relative to the structure 10.

What is claimed is:

1. Apparatus for producing pulses at a repetition rate directly proportional to angular velocity, said apparatus comprising: a base; first and second magnetic pick-ups mounted in a fixed position relative to said base; a member, said member being rotatably mounted relative to said base about a first axis; a magnetic rotor fixed relative to said movable member in a position to move therewith contiguously past said pick-ups, said rotor having a set of equally and angularly spaced teeth separated by valleys, all of said teeth being located a predetermined distance from the rotational axis of said rotor, said first and second pick-ups including a set of first and second cores, respectively, the axes of said cores being approximately parallel to each other and to said first axis, said teeth projecting toward said cores in a direction approximately parallel to said first axis, said first and second cores having first and second coils therearound, the ends of said cores closest to said teeth being spaced apart in the direction of movement thereof a distance approximately equal to $nd$, where $n$ is any positive odd integer and $d$ is one-half the distance between any two immediately adjacent teeth, one of said sets including permanent magnets, one end of said first coil being connected to one end of said second coil at a junction adjacent to each, said permanent magnets being poled, and said coils having other ends and being wound in predetermined directions such that voltages induced in said coils at said other ends relative to said junction solely by rotation of said rotor are approximately out of phase, voltages induced in said coils at said other ends relative to said junction by vibration of said rotor back and forth in opposite directions along the said first axis being approximately in phase with each other.

2. The invention as defined in claim 1, wherein each of said cores includes permanent magnet, the same type of pole of each magnet being positioned to have said rotor pass contiguous thereto.

3. The invention as defined in claim 2, wherein both of said coils are wound in substantially the same way and in the same direction around the respective magnets, both of said magnets being of substantially the same size and shape, said magnets being longitudinally polarized bar-like magents, each of said armature teeth having a width equal to the distance between two immediately adjacent pair of teeth, $n$ being equal to unity.

4. The invention as defined in claim 3, wherein an output voltage appears between said other ends of said coils when said rotor is rotated, said output voltage having a frequency, $f$, given by the formula $$f = RN/60$$

where, $f$ is in cycles per second, $R$ is the angular velocity of said rotor in revolutions per minute, and $N$ is the total number of said teeth.

5. The invention as defined in claim 1, wherein an output voltage appears between said other ends of said coils when said rotor is rotated, said output voltage having a frequency, $f$, given by the formula $$f = RN/60$$

where, $f$ is in cycles per second, $R$ is the angular velocity of said rotor in revolutions per minute, and $N$ is the total number of said teeth.

6. Apparatus for producing pulses at a repetition rate directly proportional to angular velocity, said apparatus comprising: a base; first and second magnetic pick-ups mounted in a fixed position relative to said base; a movable member rotatably mounted on said base about a first axis; a ferromagnetic armature fixed relative to said movable member in a position to move therewith contiguously past said pick-ups, said armature having a plurality of equally and angularly spaced teeth separated by valleys, all of said teeth being located a predetermined distance from the rotational axis of said armature, said first and second pick-ups including first and second permanent magnets, respectively, the axes of said magnets through the poles thereof being approximately parallel to each other and to said first axis, said teeth projecting toward said magnets in a direction approximately parallel to said first axis, said first and second magnets having first and second respective coils therearound, the poles of said magnets closest to said teeth being spaced apart in the direction of movement thereof a distance approximately equal to $nd$, where $n$ is any positive odd integer and $d$ is one-half the distance between any two immediately adjacent teeth, center-to-center, one end of said first coil being connected to one end of said second coil at a junction adjacent to each, said permanent magnets being poled, and said coils being wound in predetermined directions such that voltages induced in said coils at the other ends thereof relative to said junction solely by rotation of said rotor are out of phase, voltages induced in said coils at the other ends thereof relative to said junction by vibration of said rotor back and forth in opposite directions along the said first axis being in phase with each other.

7. The invention as defined in claim 6, wherein the same type of pole of each magnet is positioned to have said armature pass contiguous thereto.

8. The invention as defined in claim 7, wherein both of said coils are wound in substantially the same way and in the same direction around the respective magnets, both of said magnets being of substantially the same size and shape, said magnets being longitudinally polarized bar-like magnets, each of said armature teeth having a width equal to the distance between two immediately adjacent pair of teeth, $n$ being equal to unity.

9. The invention as defined in claim 8, wherein an output voltage appears between said other ends of said coils when said rotor is rotated, said output voltage having a frequency, $f$, given by the formula $$f = RN/60$$

where, $f$ is the cycles per second, $R$ is the angular velocity of said armature in revolutions per minute, and $N$ is the total number of said teeth.

10. The invention as defined in claim 6, wherein an output voltage appears between said other ends of said coils when said rotor is rotated, said output voltage having a frequency $f$, given by the formula $$f = RN/60$$

where, $f$ is the cyles per second, $R$ is the angular velocity of said armature in revolutions per minute, and $N$ is the total number of said teeth.

* * * * *